(12) United States Patent
Levine (10) Patent No.: US 9,081,629 B2
(45) Date of Patent: Jul. 14, 2015

(54) EXCLUDING COUNTS ON SOFTWARE THREADS IN A STATE

(71) Applicant: Frank Eliot Levine, Austin, TX (US)

(72) Inventor: Frank Eliot Levine, Austin, TX (US)

( * ) Notice: Subject to any disclaimer, the term of this patent is extended or adjusted under 35 U.S.C. 154(b) by 124 days.

(21) Appl. No.: 13/897,434

(22) Filed: May 19, 2013

(65) Prior Publication Data

US 2014/0344831 A1 Nov. 20, 2014

(51) Int. Cl.
 G06F 9/44 (2006.01)
 G06F 9/52 (2006.01)
 G06F 11/36 (2006.01)

(52) U.S. Cl.
 CPC .............. *G06F 9/52* (2013.01); *G06F 11/3644* (2013.01)

(58) Field of Classification Search
 None
 See application file for complete search history.

(56) References Cited

U.S. PATENT DOCUMENTS

| | | | | |
|---|---|---|---|---|
| 4,432,051 | A * | 2/1984 | Bogaert et al. | 717/127 |
| 5,257,358 | A * | 10/1993 | Cohen | 714/38.12 |
| 5,797,019 | A | 8/1998 | Levine et al. | |
| 6,256,775 | B1 * | 7/2001 | Flynn | 717/127 |
| 6,539,339 | B1 | 3/2003 | Berry et al. | |
| 6,658,471 | B1 * | 12/2003 | Berry et al. | 709/224 |
| 6,658,654 | B1 | 12/2003 | Berry et al. | |
| 6,728,949 | B1 | 4/2004 | Bryant et al. | |
| 6,904,594 | B1 | 6/2005 | Berry et al. | |
| 7,051,026 | B2 | 5/2006 | Berry et al. | |
| 7,401,012 | B1 * | 7/2008 | Bonebakker et al. | 703/2 |
| 7,421,681 | B2 * | 9/2008 | DeWitt et al. | 717/128 |
| 2005/0138639 | A1 * | 6/2005 | Hagan | 719/318 |
| 2006/0026411 | A1 * | 2/2006 | Yoshida | 712/241 |
| 2006/0282839 | A1 * | 12/2006 | Hankins et al. | 719/318 |
| 2008/0127120 | A1 * | 5/2008 | Kosche et al. | 717/131 |
| 2009/0089800 | A1 * | 4/2009 | Jones et al. | 719/318 |
| 2009/0199197 | A1 * | 8/2009 | Arimilli et al. | 718/104 |
| 2010/0017791 | A1 * | 1/2010 | Finkler | 717/158 |
| 2012/0180047 | A1 | 7/2012 | Cardona et al. | |
| 2012/0180057 | A1 * | 7/2012 | Levine et al. | 718/102 |
| 2013/0227586 | A1 * | 8/2013 | Levine et al. | 718/106 |
| 2014/0207632 | A1 * | 7/2014 | Ma et al. | 705/30 |

OTHER PUBLICATIONS

Thomas Willhalm, Intel® Performance Counter Monitor—A better way to measure CPU utilization, Aug. 16, 2012, pp. 1-12, http://software.intel.com/en-us/articles/intel-performance-counter-monitor-a-better-way-to-measure-cpu-utilization.
Microsoft, Performance Monitoring Getting Started Guide, Sep. 20, 2012, pp. 1-20, http://technet.microsoft.com/en-us/library/dd744567%28v=ws.10%29.aspx.
Milena Milenkovic, Scott T. Jones, Frank Levine, Enio Pineda (International Business Machines Corporation), Performance Inspector Tools with Instruction Tracing and Per-Thread / Function Profiling, Proceedings of the Linux Symposium vol. Two, Jul. 23-26, 2008, Ottawa, Ontario Canada.

\* cited by examiner

*Primary Examiner* — Jason Mitchell (57) ABSTRACT

The present disclosure provides a method, computer program product, and system for compensating for event counts for a thread occurring during targeted states on the thread. In example embodiments, the state is a spin loop state and instructions completed during the spin loop are eliminated from a performance report and are presented in the absence of the spin loop. In another embodiment, the event counts are interrupt counts eliminated during the spin loop.

19 Claims, 6 Drawing Sheets

EXCLUDING COUNTS ON SOFTWARE THREADS IN A STATE

TECHNICAL FIELD

The present disclosure relates to computer-implemented recording of activity for a software environment. In particular, the disclosure relates to computer-implemented recording and excluding counts relating to the state of code running on threads in the software environment.

DESCRIPTION OF THE RELATED ART

Concurrent software environments executing software threads in a computer system employ one or more synchronization mechanisms to ensure controlled access to shared resources to avoid the simultaneous use of shared resources. Software methods executing in a concurrent software environment can be synchronized using a mutual exclusion (mutex) algorithm, a software lock, a synchronization monitor, semaphores, or other synchronization mechanisms known in the art.

High scalability of multi-threaded applications running in concurrent software environments, such as Java, depend on tools to find areas of the software code that present opportunities to improve scalability by alleviating or addressing issues manifesting as bottlenecks and contention to access synchronized shared resources. Identification of such areas of software code is aided by facilities for measuring resources and where the resources are utilized.

Effective management and enhancement of data processing systems requires knowing how and when various system resources are being used. In analyzing and enhancing performance of a data processing system and the applications executing within the data processing system, it is helpful to know which software modules within a data processing system are using system resources. Performance tools are used to monitor and examine a data processing system to determine resource consumption as various software applications are executing within the data processing system. For example, a performance tool may identify the most frequently executed modules and instructions in a data processing system. The performance tool may identify those modules which allocate the largest amount of memory, or may identify those modules which perform the most I/O requests. Hardware-based performance tools may be built into the system and, in some cases, may be installed at a later time, while software-based performance tools may generally be added to a data processing system at any time.

In order to improve performance of program code, it is often necessary to determine how time is spent by the processor in executing code, such efforts being commonly known in the computer processing arts as locating "hot spots." Ideally, one would like to isolate such hot spots at various levels of granularity in order to focus attention on code which would most benefit from improvements.

For example, isolating such hot spots to the instruction level permits compiler developers to find significant areas of suboptimal code generation at which they may focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

Most software engineers are more concerned about the efficiency of applications at higher levels of granularity, such as the source code statement level or source code module level. For example, if a software engineer can determine that a particular module requires significant amounts of time to execute, the software engineer can make an effort to increase the performance of that particular module. In addition, if a software engineer can determine that a particular module is sometimes invoked unnecessarily, then the software engineer can rewrite other portions of code to eliminate unnecessary module executions.

Various hardware-based performance tools are available to professional software developers. Within state-of-the-art processors, facilities are often provided which enable the processor to count occurrences of software-selectable events and to time the execution of processes within an associated data processing system. Collectively, these facilities are generally known as the performance monitor unit (PMU) or the performance monitor of the processor. Performance monitoring is often used to optimize the use of software in a system.

A performance monitor is generally regarded as a facility incorporated into a processor to monitor selected operational characteristics of a hardware environment to assist in the debugging and analyzing of systems by determining a machine's state at a particular point in time or over a period of time. Often, the performance monitor produces information relating to the utilization of a processor's instruction execution and storage control. For example, the performance monitor can be utilized to provide information regarding the amount of time that has passed between events in a processing system. As another example, software engineers may utilize timing data from the performance monitor to optimize programs by relocating branch instructions and memory accesses. In addition, the performance monitor may be utilized to gather data about the access times to the data processing system's L1 cache, L2 cache, and main memory. Utilizing this data, system designers may identify performance bottlenecks specific to particular software or hardware environments. The information produced usually guides system designers toward ways of enhancing performance of a given system or of developing improvements in the design of a new system.

To obtain performance information, events within the data processing system are counted by one or more counters within the performance monitor. The operation of such counters is managed by control registers, which are comprised of a plurality of bit fields. In general, both control registers and the counters are readable and writable by software. Thus, by writing values to the control register, a user may select the events within the data processing system to be monitored and specify the conditions under which the counters are enabled.

Resources for counting and timing hardware events may be supported directly in hardware facilities. In addition, there may be software implemented events that are recorded and counted, for example, synchronization events, such as contention between software threads sharing shared resources.

In addition to the hardware-based performance tools and techniques discussed above, software-based performance tools may also be deployed in a variety of manners. One known software-based performance tool is a trace tool. A trace tool may use more than one technique to provide trace information that indicates execution flows for an executing application. One technique keeps track of particular sequences of instructions by logging certain events as they occur, so-called event-based profiling technique. For example, a trace tool may log every entry and corresponding exit into and from a module, subroutine, method, function, or system component within the executing application. Typically, a time-stamped record is produced for each such event. Also, performance counter values may be recorded at each event. Corresponding pairs of records similar to entry-exit records may also be used to trace execution of arbitrary code segments, starting and completing I/O or data transmission, and for many other events of interest. Output from a trace tool may be analyzed in many ways to identify a variety of performance metrics with respect to the execution environment. Embodiments may dynamically build trees identifying calling sequences or call stacks by thread.

However, instrumenting an application to enable trace profiling may undesirably disturb the execution of the application. As the application executes, the instrumentation code may incur significant overhead, such as system calls to obtain a current timestamp or other execution state information. In fact, the CPU time consumed by the instrumentation code alone may affect the resulting performance metric of the application being studied.

When instrumentation of software code is utilized in order to measure bottlenecks, synchronization events present difficulties. Contention is very sensitive to tool overhead since the execution of monitoring and measuring tools effects the synchronization dynamics of software running in a concurrent software environment.

Current tools such as the Java Lock Monitor (JLM) or the "IBM Monitoring and Diagnostic Tools for Java—Health Centre" provide monitoring and reporting of incidences of contention in the Java environment on a synchronized resource basis. However, these tools are unable to provide information on the state of a software thread at the time of contention, such as the particular software method experiencing contention. Thus, such tools cannot straightforwardly determine which software methods in an application are responsible for occurrences of contention.

Further, tools for measuring a length of time that a software thread in a particular synchronization state, such as a particular state of contention, are difficult to develop and maintain. By virtue of the nature of a concurrent software environment, the propensity for software threads to be interrupted and resumed as part of the synchronization mechanism requires complex measuring logic to determine appropriate allocation of time periods to particular synchronization states, particular software methods and particular software threads.

In addition tools, such as, Performance Inspector (Performance Inspector is a trade mark of International Business Machines Corporation) virtualizes performance monitor counters by thread and provide a means to read the accumulated values in an application state without transitioning to a kernel or operating system (privileged) state. See: http://technet.microsoft.com/en-uslibrary/dd744567%28v=ws.10%29.aspx and Performance Inspector provides the virtualization of metrics by thread.

The values may be read at points in application programs and because the information is virtualized by thread, the values read before and after a routine executing do represent the counts that occur during the execution of the routine. These values may be used to attribute counts to individual routines and accumulated. An example of the technology to attribute counts to individual routines is disclosed in U.S. Pat. No. 6,658,654B1 and hereby incorporated by reference. The problems identified in that patent are overcome by virtualizing metrics by thread as indicated in the support provided by http://software.intel.com/en-us/articles/intel-performance-counter-monitor-a-better-way-to-measure-cpu-utilization and Performance Inspector. However, the information collected, although accurate, may be affected by system conditions. Although the information is correct, the results can be confusing and misleading. In a typical example scenario, instructions completed (IC) are monitored and applied to a routine. Under normal circumstances, ICs are an excellent metric for identifying where time is spent. Cycles per instruction (CPI) are utilized to convert instructions to time. Also, instrumentation can be calibrated out, so the IC values may often be accurately reflected in performance analysis reports.

One aspect of synchronization is the utilization of a semaphore in a tight loop. For example, a cmpxchg, or a lwarx and stwcx instruction sequence are primitive, or simple, instructions used to perform a read-modify-write operation to storage. A spinlock is a lock which causes a thread trying to acquire it to simply wait in a loop ("spin") while repeatedly checking if the lock is available. Since the thread remains active but is not performing a useful task, the use of such a lock is a kind of busy waiting. Once acquired, spinlocks will usually be held until they are explicitly released, although in some implementations they may be automatically released if the thread being waited on (that which holds the lock) blocks, or "goes to sleep". The act of spinning can drastically affect the IC counts to such an extent that the counts while spinning overshadow other profiling information. The instrumentation itself affects path length and can bias the time the resources are held. However, if the routine requires a resource, which just happens to be held by a different thread. A spin lock may be utilized to attempt to acquire the resource, so the IC counts may be many orders of magnitude higher than the normal mode where the resource is available. The results may appear randomly in reports and although they correctly represent the number of IC that occurred during the profiling, the report itself presents data that may overshadow the proportions under different runs. Other conditions may also cause elapsed time and counts to increase, for example, cache misses, tlb misses, and other events occurring on the thread may affect the report and produce misleading results. These types of conditions can also bias the information collected by sampling, including those that provide full call stacks.

The present disclosure recognizes that it would therefore be advantageous to factor out or compensate for the metrics affected by spinning or other system conditions when recoding information and for producing reports.

SUMMARY

According to an embodiment of the present disclosure, there is provided, in a first aspect, a method for factoring out event counts for a thread in a thread state targeted for compensation such that: responsive to detecting a thread in a thread state targeted for compensation, performing a first action to exclude an event count for the thread; and responsive to detecting an exit of the thread state, performing a second action to include the event count for the thread.

According to an embodiment of the present disclosure; there is provided in a second aspect, a computer program product for factoring out event counts for a thread in a thread state targeted for compensation. The computer readable program code configured such that responsive to detecting a thread in a thread state targeted for compensation, performing a first action to exclude an event count for the thread; and responsive to detecting an exit of the thread state, performing a second action to include the event count for the thread.

According to an embodiment of the present disclosure, there is provided, in a third aspect, a system for factoring out event counts occurring on a thread during a state targeted for compensation comprising: a processor, an application executing on the processor wherein responsive to detecting a thread in a thread state targeted for compensation, performing a first action to exclude an event count for the thread; and responsive to detecting an exit of the thread state, performing a second action to include the event count for the thread.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and form part thereof, and used to further illustrate by way of example preferred embodiments of the present disclosure and explain principles and advantages of the present disclosure.

DETAILED DESCRIPTION OF AN ILLUSTRATIVE EMBODIMENT

Described herein is a system, method, and computer program product for compensating for counts occurring on a thread during a detected state on a processor executing instructions on the software thread in a software environment of a computer system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The corresponding structures, materials, acts, and equivalents of all means or step plus function elements in the claims below are intended to include any structure, material, or act for performing the function in combination with other claimed elements as specifically claimed. The description of embodiments of the present disclosure has been presented for purposes of illustration and description, but is not intended to be exhaustive or limited to the form disclosed. Many modifications and variations will be apparent to those of ordinary skill in the art. The embodiment was chosen and described in order to best explain the principles and the practical application, and to enable others of ordinary skill in the art to understand various embodiments of the disclosure with various modifications as are suited to the particular use contemplated.

Figure 1:
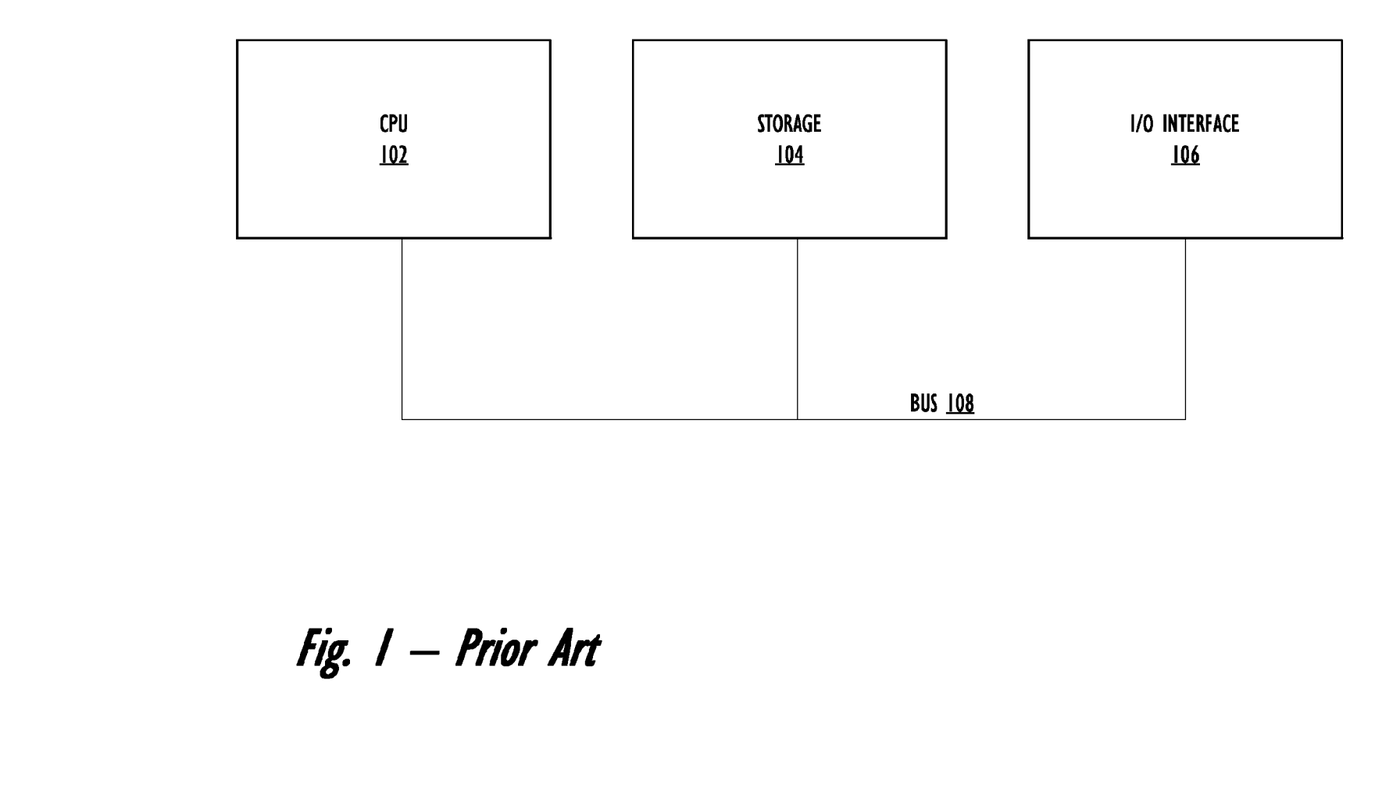
FIG. 1 illustrates a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. Storage 104 can be any read/write storage device such as a random access memory (RAM) or a non-volatile storage device. An example of a non-volatile storage device includes a disk or tape storage device. I/O interface 106 interfaces with devices that provide input or output of data or both input and output of data. Examples of I/O devices connectable to I/O interface 106 include a keyboard, a mouse, a display (such as a monitor), and a network connection.

Figure 2:
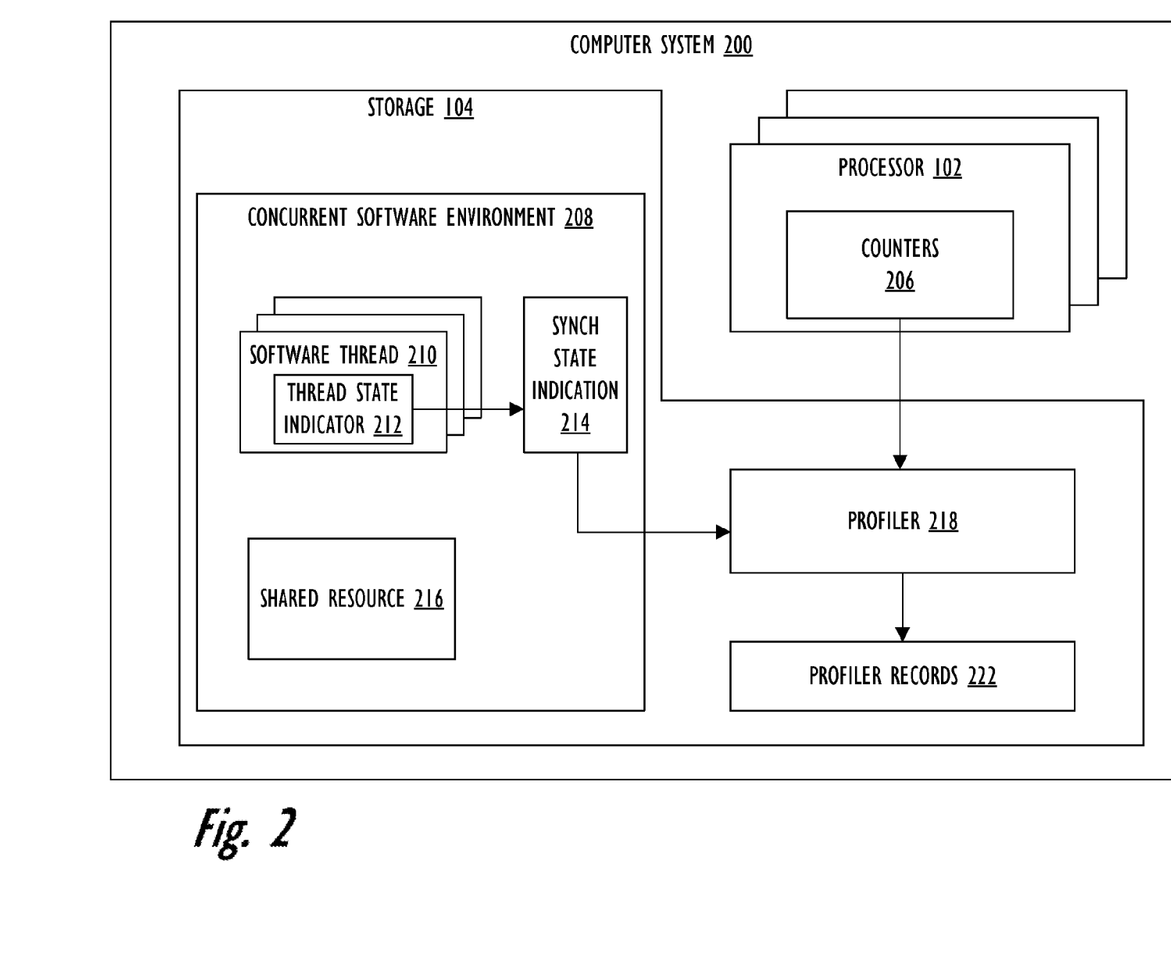
FIG. 2 illustrates an arrangement of an activity recording system implemented in a computer system according to an embodiment of the present disclosure.

FIG. 2 illustrates an arrangement of an activity recording system implemented in a computer system 200 according to an embodiment of the present disclosure. Computer system 200 includes one or more processors 102 for executing instructions. Each processor 102 in the computer system 200 includes counters 206 as registers or another suitable store for storing values. Many different types of counters may be supported. Each processor has a counter, hereafter, called "program counter 206" indicating a current position in a sequence of instructions executed by processor(s) 102 wherein program counter 206 is a counter in the counters 206, Program counters are also known as instruction pointers, instruction address registers, or instruction sequencers. Program counter 206 can hold an address for an instruction currently being executed or, alternatively, can hold an address for a next instruction to be executed depending on a particular arrangement of processor(s) 102. Each processor may also have a set of performance monitor counters that may be counting events, such as, IC, hereafter, called "performance counter 206" wherein performance counter 206 is a plurality of counters in the counters 206.

Preferably, processors 102 are multiple independent processors in a multiprocessor computer system. However, processors 102 can also be constituted as separate computing systems organized in a network of interoperating computer systems, such as an array of computer systems. Each system in such an array can independently contain the essential features of a computer system outlined above with respect to FIG. 1. For example, processors 102 can be constituted within a rack computer arrangement, a blade server or other suitable array of computer systems. In a further alternative, processors 102 can be constituted as separate processing elements of a single processor, such as separate processing cores of a processor unit. Combinations of such processor arrangements conceived here are also suitable in embodiments of the one or more processors 102.

Computer system 200 further includes storage 104 which may be, for example, a volatile memory store. Storage 104 stores a profiler 218. Profiler 218 is a component for recording values of counters 206 for processor(s) 102 in computer system 200. The values of counters 206 are recorded as profiler records 222 in storage 104, an alternative memory, or other store associated with computer system 200.

In operation, profiler 218 may be configured to perform various tasks. The tasks are typically identified by parameters, options, passed to the profiler. The tasks can be performed individually or concurrently. In some embodiments, the tasks can be changed dynamically by utilizing a socket interface and dynamically reconfiguring the profiler to support the change of options without requiring a restart of the application being profiled. In one configuration, profiler 218 is configured as an interrupt profiler, when configured as an interrupt profile, profiler 218 will, hereafter, referred to as interrupt profiler 218. Interrupt profiler 218 interrupts the execution of processor 102 periodically (known as a profiler 'tick') to record a value of program counter 206 before resuming execution of interrupted instructions. These interrupts could be based on a performance counter overflow for a performance monitor counter supported by a PMU or a time based periodic interrupt supported by a programming interrupt device, for example, an Advanced Programmable Interrupt Controller (APIC). Program counter 206 corresponds to an address in the storage 104 of an instruction in an instruction sequence for a software thread 210 which executed on processor 102. In a concurrent environment, many threads may have last executed on any given logical processor; however, only one thread can be executing instructions on any given logical processor at the time of the profiler interruption (the tick). Program counter 206 may also refer to a plurality of instruction address values for threads previously executing on processor 102 and no longer executing, that is its suspended state. The interruptions take place at regular intervals such that a value of program counter 206 is polled at regular intervals by interrupt profiler 218. Interrupt profiler 218 can be further operable to record values of program counters for multiple processors and multiple threads according to a criteria supported by interrupt profiler 218 in computer system 200, including creating a record of an identifier of a processor and thread corresponding to each value of the program counter 206.

Alternatively, profiler 218 may be configured to receive events from an application. In an embodiment, profiler 218 is configured to receive entry and exit events from code, for example, from any of function, subroutines, and methods. This may be supported via interfaces, instrumentation, dynamic code modification and other various ways known in the art. When the profiler receives control, it acquires counts that are virtualized by thread and may be configured to write trace records or to dynamically produce call stack trees. The difference in counts between events may be applied to the currently executing routine to provide reports by method in a thread oriented presentation. Hereafter, when profiler 218 is programmed to receive events and acquire counts that are virtualized by thread, profiler 218 will be referred to as event profiler 218.

As will be apparent to those skilled in the art, profiler 218 can be implemented entirely in software stored in the store 104. For example, profiler 218 can be based on an application tool, such as the "TProf" tool and the Java Profiling Tool (jprof) both developed by IBM and detailed at perfinsp.sourceforge.net/tprof.html (IBM is a registered trademark of International Business Machines Corporation).

Alternatively, profiler 218 can be implemented outside the store 104 embodied entirely in hardware, or a combination of both software and hardware. For example, the profiler 218 can be a software routine executing on computer system 200, such as an operating system or kernel function, having close cooperation with the one or more processors 102 of the computer system 200. Alternatively, profiler 218 can employ processor instructions specifically directed to storing a value of counter 206. In another embodiment, profiler 218 may be a function of a Just In Time (JIT) compiler for the concurrent software environment 208, known as a "sampling thread".

Storage 104 further stores a concurrent software environment 208. Concurrent software environment 208 is an environment in which software is designed as a collection of one or more computational processes suitable for execution simultaneously in parallel. Notably, the suitability for such parallel simultaneous execution does not necessarily require that concurrent software is actually executed in parallel. A concurrent software environment can imitate parallel execution using a single processor, or can implement true parallel execution using multiple processors, such as in any of the arrangements of processor(s) 102 described above. Concurrent programs can be executed sequentially on a single processor by interleaving the execution steps of each computational process, or executed in parallel by assigning each computational process to one of a set of processors that are close or distributed across a network. An example of such a concurrent software environment is a Java Runtime Environment.

A plurality of software threads 210 in computer system 200 execute concurrently in the concurrent software environment 208 as concurrent computational processes. For example, software threads 210 are threads of execution in a Java program including software methods executing for instantiated Java objects.

Software threads 210 are each operable to access a shared resource 216. Shared resource 216 can be any resource suitable for access by threads in concurrent software environment 208 such as a hardware or software resource, shared memory area or other storage, a device, processor or any other resource. For example, the shared resource 216 can be a Java object, such as a Java object including synchronized software methods in the Java environment.

The concurrent software environment 208 employs one or more synchronization mechanisms to ensure controlled access to the shared resource 216 and in order to avoid the simultaneous use of the shared resources 216 by multiple software threads 210.

For example, concurrent software environment 208 can synchronize software threads 210 using a mutual exclusion (mutex) algorithm, a software lock, a synchronization monitor, semaphores or other synchronization mechanisms known in the art. Such mechanisms can employ an exclusionary construct to avoid the simultaneous use of shared resource 216. Exclusionary constructs used in such synchronization mechanisms can include locks, monitors and semaphores. Hardware may employ transactional memory and provide synchronization support.

For example, software threads 210 accessing a software object having a synchronized software method as shared resource 216 can be synchronized by the use of a software monitor to restrict access to the software object to a single thread at any one point in time. Different states of operation can be used to describe a thread operating in environments synchronized by exclusionary constructs.

A software thread 210 executing in computer system 200 which seeks to obtain access to shared resource 216 can be said to seek to "acquire" an exclusionary construct associated with shared resource 216. Similarly, a thread 210 currently having synchronized access to shared resource 216 can be said to be "holding" an exclusionary construct associated with shared resource 216, also known as a "held" state of software thread 210.

Synchronization mechanisms to achieve the sharing of shared resource 216 involve threads entering other states of operation. A synchronization mechanism can require a thread 210 seeking to acquire an exclusionary construct to enter a "spin" state before it can hold the exclusionary construct. A thread in the "spin" state is actively executing on a processor 102 but is unable to access the shared resource 216 associated with the exclusionary construct. Normally, a thread in a "spin" state is not able to perform useful work as it seeks to acquire the exclusionary construct. Thus such threads normally do not execute other software routines or methods while in the "spin" state.

Synchronization mechanisms can lead to thread 210 failing to acquire an exclusionary construct for shared resource 216 leaving the thread in a "blocked" state, unable to access shared resource 216. Threads in a "blocked" state are unable to execute and cease to be subject to processing by any processor(s) (e.g. processors 102) in computer system 200 while in the "blocked" state. Such blocking can be temporary until the exclusionary construct subsequently becomes available for thread 210 to acquire.

A thread (e.g. thread 210) holding an exclusionary construct can enter a "wait" state while that thread waits for processing to be undertaken by another thread. Such "wait" states are normally exited by receipt of a notification or, in the case of "timed wait" states, by expiration of a predefined time period. A software thread 210 in the "wait" and "timed wait" states is unable to execute and cease to be subject to processing by any processor(s) 102 in the computer system 200 until the notification is received by software thread 210 or the time period expires. Threads which enter a "wait" state normally release an exclusionary construct and re-acquire it when they exit the "wait" state.

Further, threads 210 can be in a "runnable" state, being a state where a thread 210 is able and ready to execute on processor(s) 102 of the computer system 200 but where processor(s) 102 is currently not yet assigned to thread 210 for execution.

Each of software threads 210 includes a thread state indicator 212 for recording an indication of a current synchronization state 214 for thread 210. Synchronization state indication 214 is associated with a particular thread and can indicate any or all of the states of: "held", "spin", "blocked", "wait" (either "wait" or "timed wait"), "runnable", and an indication of an unsynchronized state of the particular thread. In an embodiment, synchronization state indication 214 is set by the software thread 210 itself. In an alternative embodiment, synchronization state indication 214 is set by concurrent software environment 208, such as by a virtual machine in a Java Runtime Environment.

The arrangement of FIG. 2 will now be described in use to demonstrate the advantages of embodiments of the present disclosure. In use, synchronization state indication 214 is set at, shortly before, or shortly after, a change to the synchronization state of software thread 210. For example, a software thread 210 that is acquiring a synchronization construct for access to the shared resource 216 updates synchronization state indication 214 to reflect a 'held' state. Similarly, a software thread 210 that is about to enter a 'spin' state updates synchronization state indication 214 to reflect a 'spin' state. Since events counts may be affected by spinning, in particular, IC counts are incremented on a thread while spinning on the thread, providing a means to factor out counts attributed to spinning when the profiler is configured to receive control at application events would avoid presenting potentially large values of IC to a single method. Various approaches, some of which are described in FIG. 6, may be utilized to achieve this effect.

In use, interrupt profiler 218 polls and records regular values of program counter 206 for each of the one or more processor(s) 102 to profiler records 222. Profiler 218 is adapted to record a synchronization state to profiler records 222 for a software thread 210 executing on a polled processor 102. The synchronization state is based on an identification of which software thread 210 is executing on the polled processor(s) 102 and the synchronization state indication 214 stored by software thread 210. State information for threads in states which involve executing on one of the one or more processor(s) 102 can be determined and recorded in this way. This includes the 'spin', the 'held' state, and the unsynchronized execution state.

Thus, in use, the arrangement of FIG. 2 is operable to record synchronization "held" and "spin" state information for threads 210 executing in concurrent software environment 208 at regular time intervals by polling by interrupt profiler 218. Such polling can be a fine grained or atomic process presenting extremely low processing overhead for computer system 200 and, thus, has a substantially negligible impact on the synchronization dynamics of concurrent software environment 208. Also, with respect to concurrent software environment 208, the processing of interrupt profiler 218 is passive insofar as the polling of program counter 206 values and synchronization state indication 214 do not require the active involvement of concurrent software environment 208. Further, the regularly timed synchronization "held" and "spin" state information for multiple software threads 210 can inform a process of analyzing the synchronization behavior of software threads 210 to improve efficiency, operability and scalability of concurrent software environment 208.

In an embodiment, each value of program counter 206 is resolved to an identification of an executing software method for a thread executing on processor(s) 102. For example, profiler 218 can use a resolver to determine, for each address value of the program counter 206 recorded by profiler 218, a symbolic name identifying software code for a software thread 210 including an instruction stored at the address. Thus, symbol names including function, procedure, subroutine or method names in a software thread 210 are retrieved by the resolver for each address recorded by interrupt profiler 218. The resolver can be a function of interrupt profiler 218 or can be a supplementary function or tool stored in storage 204.

The arrangement of FIG. 2 can further include a calculation component (not pictured) for calculating a proportion of the regular intervals profiled by interrupt profiler 218 for which a software thread 210 was in a particular synchronization state. For example, a percentage of total time that a software thread 210 was in a 'held' state can be calculated. A calculation component can be comprised as part of interrupt profiler 218. Alternatively, a calculation component can be a separate or additional software or hardware component capable of interacting with profiler records 222 generated by the profiler component 218.

In an embodiment, the thread state indicator 212 additionally records an identification of the shared resource 216 sought for access by the software thread 210. For example, the thread state indicator 212 can record the identification along with the synchronization state indication 214. Such identification can include, for example, a class name of an object or an identifier of a synchronized software method, routine, device, data item or other shared resource. Further, in an embodiment, the resolver is operable to determine a symbolic name associated with an identifier of shared resource 216 recorded by the thread state indicator 212. For example, a name of a software routine such as a software method or function is recorded with the synchronization state indication 214. Where the shared resource 216 includes software objects including objects having synchronized routines, such as a synchronized software method. The shared resource 216 might correspond to a routine in a service library called by a calling software routine, such as a class library, a standard library, a service routine, or a primitive method or function. In such situations it can be unhelpful to record an indication of the routine itself (since such routines can be called frequently by many methods) and instead, an identifier of a 'calling' routine can be determined and recorded additionally or instead. A 'calling' routine can be identified from a call stack and/or resolver.

In an embodiment, the thread state indicator 212 additionally affects counts virtualized by thread.

In an embodiment, non executing threads are examined and trace information is recorded. This may be done by examining thread control blocks.

In an embodiment, the thread state indicator 212 additionally affects subsequent processing. In particular, the spin state excludes the thread from being utilized in a report identifying calling sequences and overhead associated with walking the call stack. In an embodiment, the exclusion is based on a percentage intended to compensate for the effect of instrumentation and performance monitoring overhead. In an embodiment, a Tprof without any additional instrumentation is taken to establish a base line and compared to a Tprof with additional instrumentation. The ratio is utilized to establish a compensation percentage. In an embodiment, transaction rate without instrumentation is compared to a transaction rate with instrumentation to establish a compensation percentage. Thread characteristics, such as, names are utilized to determine threads for call stack retrieval and analysis.

Figure 3:
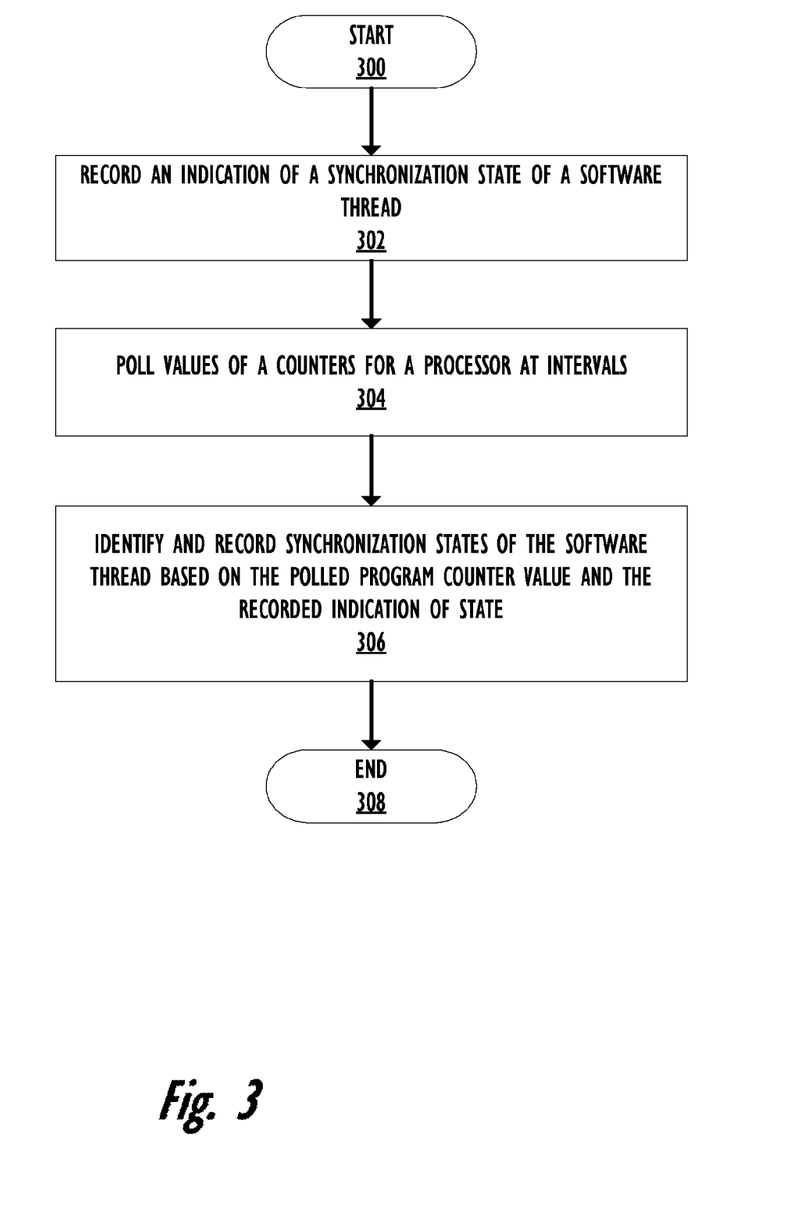
FIG. 3 illustrates a flow diagram of a method for recording activity for interrupt based monitoring of executing software threads in the computer system according to an embodiment of the present disclosure.

FIG. 3 is a flowchart of a method for recording activity for concurrent software environment 208 executing software threads in computer system 200 according to an embodiment of the present disclosure. At step 302 thread state indicator 212 records a synchronization state indication 214 of a synchronization state for a software thread 210. The synchronization state indication 214 is associated with an identification of software thread 210. In some embodiments, at step 304, event profiler 218 polls values of performance counter 206 for the one or more processors 102 at an occurrence of a synchronization state change and when events occur. In embodiments where profiler 218 is configured as an interrupt profiler 218, at step 306 the interrupt profiler 218 identifies and records one or more synchronization states of the software thread 210 based on the polled program counter value 206 and the recorded synchronization state indication 214. The process then terminates at block 308.

Many of the embodiments described above are suitable for recording synchronization "held" and "spin" state information for threads 210 actively executing on one or more of processor(s) 102. The embodiments rely on polling program counter 206 and thread synchronization state indication 214 for the interrupted processor provide useful information for threads actively executing on a processor 102. Threads not actively executing on a processor 102, such as threads in a "blocked", "wait" (either "wait" or "timed wait") or "runnable" states, are not be identified by the polling of interrupt profiler 218 described above. They may be determined by examining operating system thread control block structures or other control block structures such as may be supported by a JVM.

Figure 4:
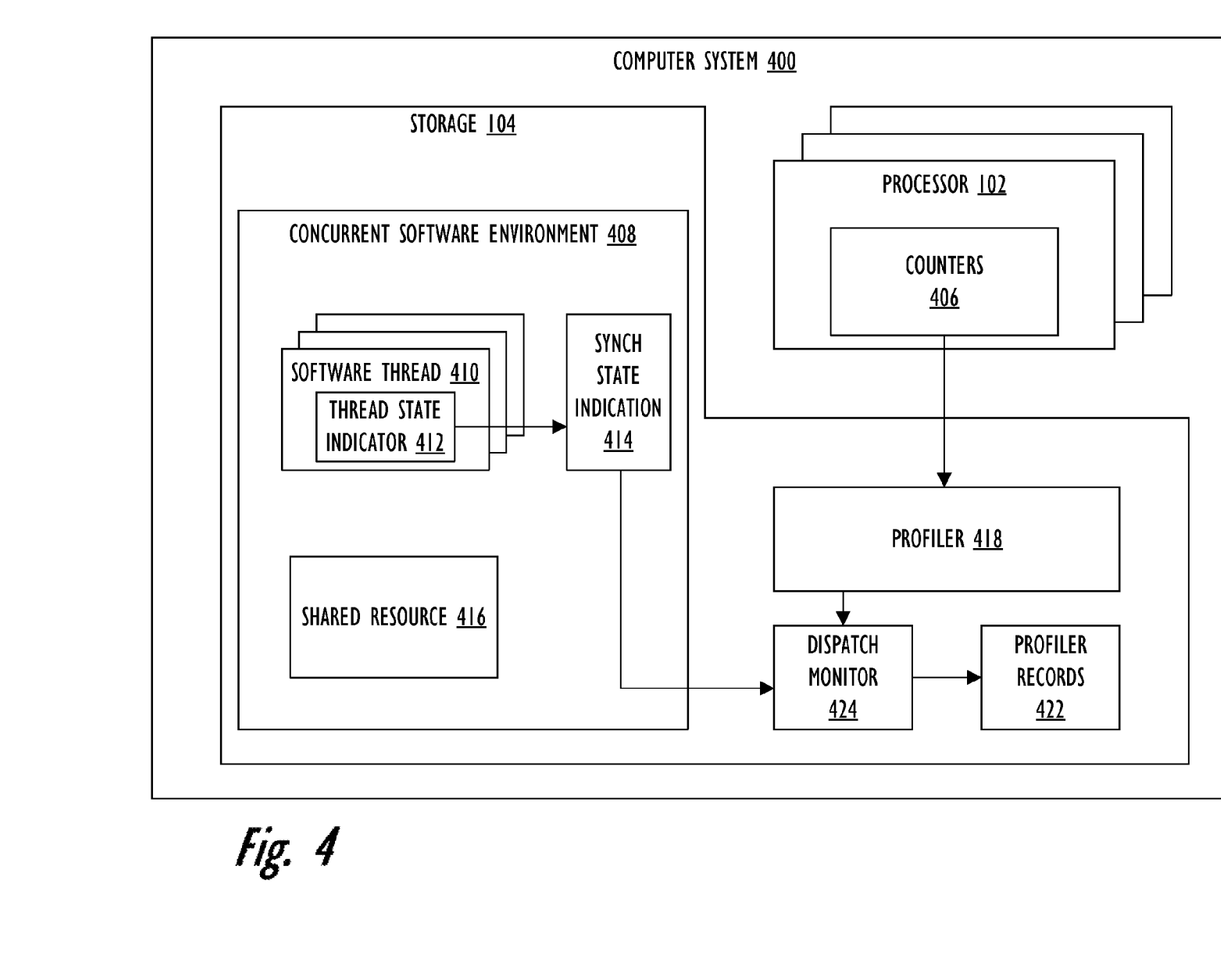
FIG. 4 illustrates a block diagram of an enhanced arrangement of an activity recording system implemented in a computer system according to an embodiment of the present disclosure.

FIG. 4 illustrates an enhanced arrangement of an activity recording system implemented in a computer system 400 according to an embodiment of the present disclosure. The arrangement is an alternative to examining control block structures. Many of the features of FIG. 4 are identical to those described above with respect to FIG. 2 and these will not be repeated here. The arrangement of FIG. 4 is enhanced with respect to FIG. 2 in that the arrangement of FIG. 4 is suitable for recording synchronization state information for software threads 410 in concurrent software environment 408 where the threads are not actively executing in processor(s) 102 of computer system 400. The arrangement depicted in FIG. 4 can supplement the arrangement of FIG. 2 such that, in certain embodiments, the features described with respect to FIG. 2 can be implemented in addition to the features described below with respect to FIG. 4.

The thread state indicator 412 of FIG. 4 is operable to record indications of a synchronization state of software threads 410 in which the software thread ceases to execute in processor(s) 102 of the computer system 400. Thus, in the arrangement of FIG. 4, the thread state indicator 412 records indications of "blocked", "wait" (either "wait" or "timed wait") and "runnable" states to synchronization state indication 414. Otherwise the thread state indicator 412 of FIG. 4 is substantially identical to that described above with respect to FIG. 2.

Interrupt profiler 418 of FIG. 4 is operable to identify one or more processor(s) 102 being idle. Processor(s) 102 is considered to be idle if none of the software threads 410 are dispatched to execute on processor(s) 102. Interrupt profiler 418 records such idleness by storing an indication that processor(s) 102 is idle at a particular point in time. In an alternative embodiment, interrupt profiler 418 is further operable to identify a time period over which processor(s) 102 is continuously idle as an idle period for the processor 102.

The storage 104 of FIG. 4 further stores dispatch monitor 424. Dispatch monitor 424 is operable to identify when software thread 410 is dispatched for execution on processor(s) 102. Dispatch monitor 424 can be implemented as a software routine coexisting with concurrent software environment 408 and interrupt profiler 418. Alternatively, dispatch monitor 424 can be implemented in an operating system or kernel of computer system 400. Dispatch monitor 424 can also be implemented entirely or partly in hardware.

In use, dispatch monitor 424 identifies a dispatch of software thread 410 to processor(s) 102. In response to such identification, dispatch monitor 424 determines if processor(s) 102 to which the thread is dispatched was idle immediately before the dispatch by reference to interrupt profiler 418. If it is determined processor(s) 102 was idle, dispatch monitor 424 obtains a synchronization state of dispatched thread 410 to determine if dispatched thread 410 is in a synchronization state that may account for the idleness of the processor(s) 102. For example, if synchronization state indication 414 for dispatched software thread 410 indicates that the software thread 410 was blocked (a "blocked" state) up to the point of dispatch, the blocking may account for the idleness of processor(s) 102. Such conclusions can be drawn for "blocked", "wait" ("wait" and "timed wait") and "runnable" states of software threads 410. In an alternative embodiment, when a continuous idle period is recorded for a processor(s) 102, the synchronization state may account for the idle period and may be attributed to idle period.

Where the dispatch monitor identifies a synchronization state of a dispatched thread 410 that accounts for the idleness of a processor(s) 102, the dispatch monitor generates a record of the synchronization state of the thread, such as in profiler records 422, and attributes the idleness to the dispatched thread and the indicated synchronization state of dispatched thread 410. In this way idleness of processor(s) 102 that may be caused by particular synchronization states of software threads 410 are attributed to those states and threads.

Thus the arrangement of FIG. 4 is operable to record synchronization "blocked", "wait" and "runnable" state information for software threads 410 executing in concurrent software environment 408 and attribute such states to idleness of processor(s) 102 identified by interrupt profiler 418. Checking and polling by interrupt profiler 418 and the dispatch monitor 424 can be fine grained or atomic processes presenting extremely low processing overhead for computer system 400 and, thus, have a substantially negligible impact on the synchronization dynamics of concurrent software environment 408. Also, with respect to concurrent software environment 408, the processing of interrupt profiler 418 and dispatch monitor 424 is passive insofar as the checking for idleness of processor(s) 102 and polling of synchronization state information 414 and does not require the active involvement of concurrent software environment 408. Further, the records of "blocked", "wait" and "runnable" state information for the multiple software threads 410 can inform a process of analyzing the synchronization behavior of the software threads 410 to improve efficiency, operability and scalability of concurrent software environment 408. A thread in a spin state may also be targeted for elimination from reports.

Figure 5:
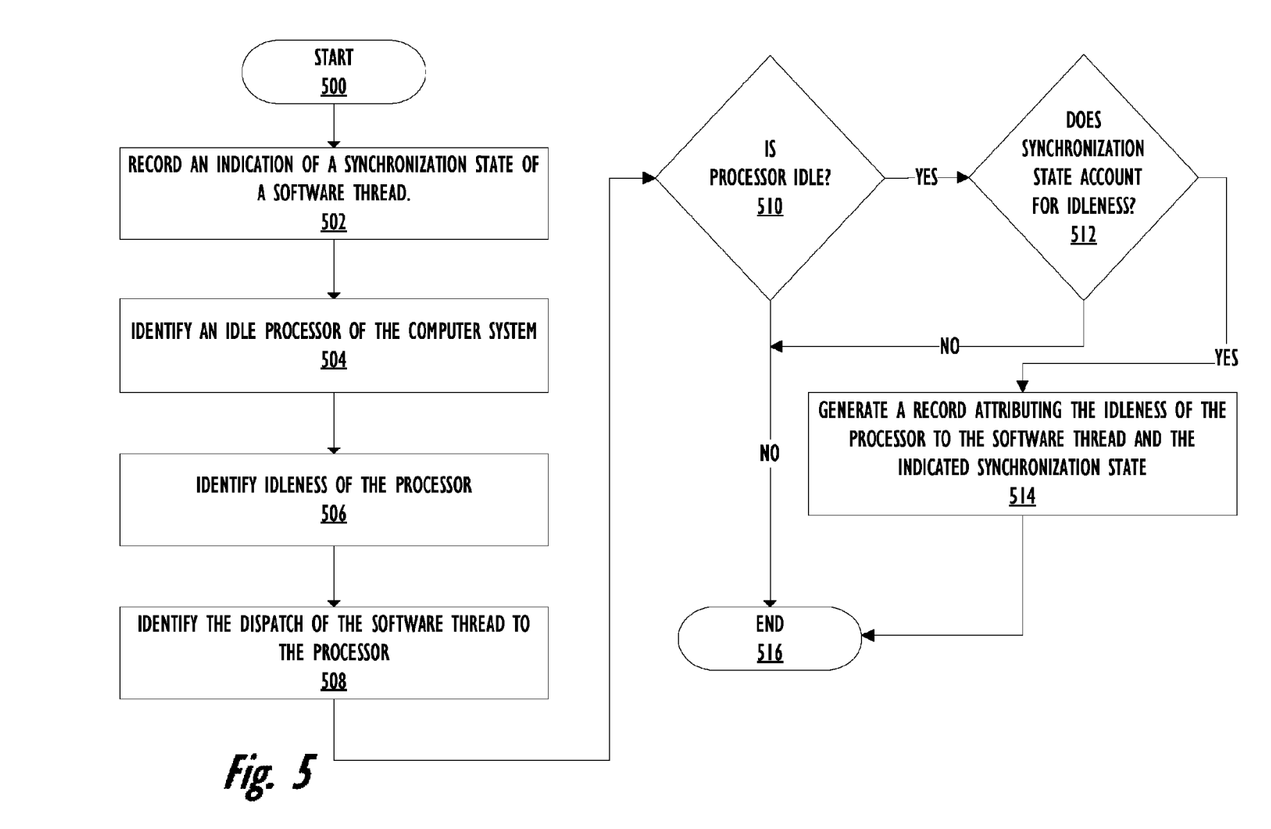
FIG. 5 illustrates a flow diagram of an enhanced method for recording activity for the concurrent software environment executing software threads in the computer system according to an embodiment of the present disclosure.

FIG. 5 is a flowchart of a method for recording activity for concurrent software environment 408 executing software threads 410 in the computer system 400 according to an embodiment of the present disclosure. At step 502 the thread state indicator 412 records a synchronization state indication 414 of software thread 410 in which software thread 410 ceases to execute in processor(s) 102 of the computer system 400. Synchronization state indication 414 is associated with an identification of the software thread 410. At step 504 interrupt profiler 418 identifies an idle processor(s) 102 of the computer system 400 and records an indication that the processor is idle. At step 506 interrupt profiler 418 identifies an idleness of the processor(s) 102. In an embodiment, the idleness is identified as an idle period during which processor(s) 102 is continuously idle. At step 508 dispatch monitor 424 identifies the dispatch of software thread 410 to the processor(s) 102. At step 510 it is determined if processor(s) 102 is idle. If processor(s) 102 is determined to not be idle, the process terminates at block 516. If processor(s) 102 is determined to be idle, it is then determined if the synchronization state of software thread 410 accounts for the idleness of processor(s) 102 (e.g. a "blocked", "wait" or "runnable" state), as shown at step 512. If the synchronization state of software thread 410 does account for the idleness of processor(s) 102, dispatch monitor 424 generates a record in the profiler records 422 attributing the idleness of the processor(s) 102 to software thread 410 and the indicated synchronization state for software thread 410 (step 514). Interrupt profiler 418 is further operable to reset the indication that processor(s) 102 is idle in response to dispatch monitor 424 identifying the dispatch of the software thread 410 to the processor(s) 102. The process then terminates at block 516.

The arrangement of FIG. 4 can further include a calculation component (not pictured) for calculating a proportion of time profiled by interrupt profiler 418 and dispatch monitor 424 for which software thread 410 was in a particular synchronization state. For example, a calculation of a percentage of total time that processor(s) 102 is idle being attributed to software thread 410 being in a "blocked" state. Such calculation component can be comprised as part of interrupt profiler 418 or as part of dispatch monitor 424. Alternatively, such calculation component can be a separate or additional software or hardware component.

In an embodiment, the interrupt profiler 418 of FIG. 4 can further include the regular program counter polling features of interrupt profiler of FIG. 2. The program counter polling conducted by interrupt profiler 418 can be employed to measure an idle period for an idle processor by counting a number of regular intervals during which processor(s) 102 is idle. Further, the idle period can be recorded by interrupt profiler 418 as a count of regular intervals along with the indication that processor(s) 102 idle. In an embodiment, the indication that the processor is idle includes the count of the number of regular intervals during which the processor is idle.

In another embodiment, thread state indicator 412 additionally records an identification of shared resource 416 sought for access by software thread 410, as described above with respect to FIG. 2. The arrangement of FIG. 4 can further include the resolver described above with respect to FIG. 2 for performing resolution of symbolic names.

Figure 6:
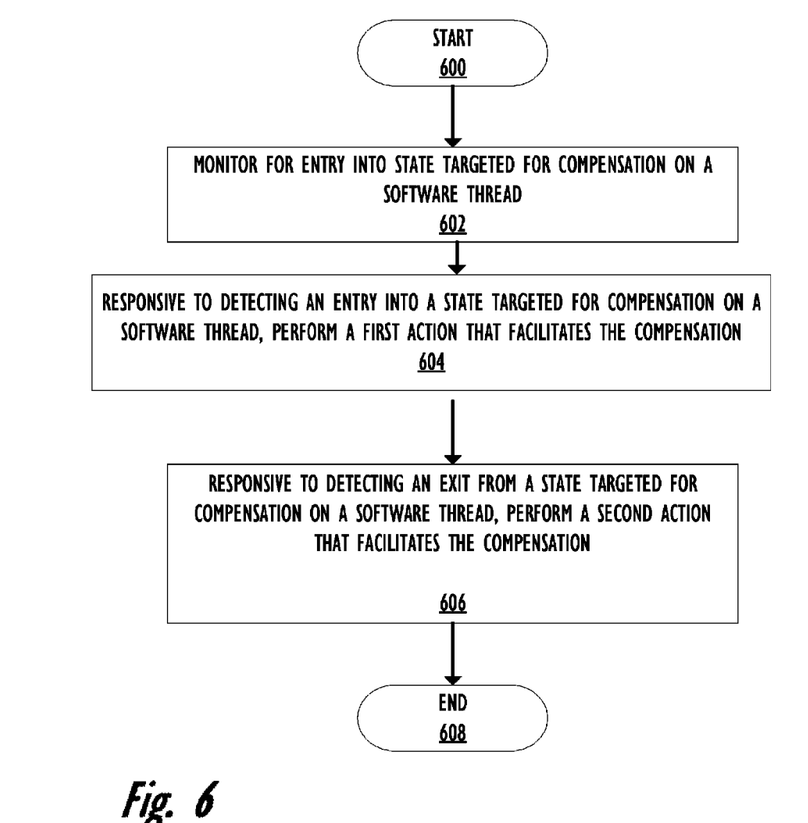
FIG. 6 illustrates a block diagram of an enhanced method for recording activity for event based concurrent software environment executing software threads in the computer system according to an embodiment of the present disclosure.

FIG. 6 is a flowchart of a method for recording activity for concurrent software environment 208 executing software threads in computer system 200 according to an event based embodiment of the present disclosure. At step 602 the system is configured to monitor and detect a state slated for compensation. At step 604, responsive to detecting the state slated for compensation, a first action is taken. In an embodiment, the first action is to read performance counter 206 to reflect an entry to the state counter value and save the entry to the state counter value in work area associated with the thread currently executing. This may corresponds to, for example, thread state indicator 212 recording a synchronization state indication 214 of a synchronization state for a software thread 210. In an embodiment where the operating system supports virtualization of counters by thread, an API to the operating system routine providing an additional compensation option may directly provide that functionality. Alternatively, application code reading the operating system provided counters may have its own thread work area to save the value counter value. After saving the entry to state counter value, the flow proceeds to step 606 where the method continues when an exit from the state slated for compensation occurs. Responsive to detecting the exit from the state slated for compensation, a second action is taken. In this embodiment, the second action is to read the counter value to reflect an end state value. The difference between the end state value and the start state value is further utilized. In an embodiment the value is accumulated in a thread work area represents the count occurring on the thread during the state. In another embodiment, the value is subtracted from the values of the counts maintained in a thread work area in a manner that factors out the counts that occurred during the state.

In another embodiment, the first action is to prevent continued counting of events on the thread by the PMU. In that embodiment, the second action is to allow continued counting of events on the thread by the PMU.

The synchronization state indication 214 is associated with an identification of software thread 210. In some embodiments, at step 304, event profiler 218 polls values of performance counter 206 for the one or more processors 102 at an occurrence of a synchronization state change and when events occur. In embodiments where profiler 218 is configured as an interrupt profiler 218, at step 306 the interrupt profiler 218 identifies and records one or more synchronization states of the software thread 210 based on the polled program counter value 206 and the recorded synchronization state indication 214. The process then terminates at block 308.

What is needed to overcome the misleading reports is a way to adjust the reports to separate or avoid the reporting counts caused by the detected system states. In an embodiment, the state is detected by the operating system and adjusted by the operating system. In another embodiment, the state is detected by the application and adjusted by the application. In another embodiment, the state is detected at the application level and communicated to the operating system which handles the compensation.

In another embodiment, the operating system or kernel supports virtualization of counters by thread. The performance counters may be supplied by the hardware, the software, or a combination of both. They are accumulated with large values, for example, 64 bit values that do not overflow or wrap during the monitoring. The values of the counters can be read by an application without transitioning to a kernel state. The operating system supports an API identifying what to count and under what states to support compensation. The operating system supports semaphores for locking. In an example scenario, instructions completed is counted by an on-chip performance monitoring unit (PMU) and the operating system supports virtualizing the IC counts by thread and compensation for contended semaphores. A Java profiler is counting instructions and compensating for IC due to contended semaphores.

In an example scenario, at the entry to function F1, the IC count at the entry is recorded by the profiler to be 100 and F1 requests an operating system semaphore, which is not currently available. The OS library detects the contended state, increments a counter for the thread indicating the state occurrence, and saves the value of the IC count, say 110. In this example, a cmpxchg loop is utilized to acquire the resource after 100000 tries with two instructions executed each try. The value of the IC count at the time the semaphore is acquired is 2000110 and the delta count 2000000 in the counts attributed to semaphores. F1 continues executing until it is ready to call another function, say F2, say 1000 additional instructions. In this scenario when the profiler reads the new count at entry to F2, the value returned by the API is 1100. Where the value of 2001110 is not seen by the profiler.

In an embodiment the API reads the initial value of the 64 bit performance counters maintained by the operating system and the previous value of the counter when the thread was dispatched. These "last dispatched values" if not changed, verify that counters have not been affected by dispatches. In this embodiment, the API reads the PMCs directly from the hardware by reading from special purpose registers (SPRs), and takes the difference between the current value and the initial value (accounting for wrapping) to identify the change. The thread work area between the API and the kernel is a mapped data area allowing access by both the kernel state and application state. In this embodiment, the counters are read and saved for the counts attributed to acquiring the semaphore. Similarly, the counts are adjusted when the semaphore is released.

In another embodiment, the values of the counters are reset to compensate for the change during the handling of the semaphore. In another embodiment, the counts stop during the handling of the semaphore and counting continues after the semaphore is released.

In cases where the counts are accumulated in a separate area while attempting to acquire the semaphore, the count deltas themselves can be utilized as separate metrics applied to individual functions, subroutines, and methods. Reports can be generated to identify a summary of the counts spent acquiring semaphores by thread, process, and system.

With hardware assist, the detection of the state and the counting can be triggered by the states in the hardware. In the case of powerPC, the execution of a lwarcx instruction would indicate the start of the state.

Embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system.

Suitably, the computer program is stored on a carrier device in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure. In the context of this document, a carrier medium may be any tangible medium that can contain, or store a program for use by or in connection with an instruction execution system, apparatus, or device.

In the apparatus, computer readable storage device, and method of the present disclosure, the components or steps may be decomposed and/or recombined. The decomposition and/or recombination may be viewed as equivalent solutions of the present disclosure. Moreover, the steps executing the above series of processing may be naturally performed in time order according to the sequence of the description, but they may not necessarily be performed in time order. Some steps may be performed in parallel or independently of each other.

While the disclosure has been described with reference to exemplary embodiments, it will be understood by those skilled in the art that various changes may be made and equivalents may be substituted for elements thereof without departing from the scope of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. In addition, many modifications may be made to adapt a particular system, device or component thereof to the teachings of the disclosure without departing from the essential scope thereof. The embodiment was chosen and described in order to best explain the principles of the disclosure and the practical application, and to enable others of ordinary skill in the art to understand the disclosure for various embodiments with various modifications as are suited to the particular use contemplated. Therefore, it is intended that the disclosure not be limited to the particular embodiments disclosed for carrying out this disclosure, but that the disclosure will include all embodiments falling within the scope of the appended claims.

Although the present disclosure and advantages thereof have been described in detail, it will be understood that various changes, substitution and transformation may be made thereto without departing from the spirit and scope of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. A method for factoring out event counts for a routine executing on a thread in a thread state targeted for elimination of event counts comprising:
    accumulating a per thread event count dynamically for a routine executing on a thread;
    responsive to detecting the routine executing on the thread entering the thread state targeted for elimination of event counts, storing an event count indicating a last saved count of an event counter in a control block associated with the thread;
    responsive to detecting an exiting of the thread state, reading a current value of the event count and utilizing a difference between the current value of the event count and the last saved event count in the control block associated with the thread to calculate a per thread count of the event during the thread state; and
    reducing the per thread count of the event from an accumulated event count for the event for the routine according to the difference.

2. The method of claim 1, wherein the thread state is a software spin loop.

3. The method of claim 1, wherein the last saved count is updated when the thread is dispatched out of the thread state.

4. The method of claim 3, further comprising:
    storing a state accumulated value of the event in a location different from a non-state accumulated value of the event.

5. The method of claim 1, wherein the thread state is a failure to acquire a resource state for the thread and the event count factored out are instructions completed.

6. The method of claim 1, wherein the event count is counted by a performance monitoring unit on a processor executing instructions on the thread.

7. The method of claim 1, wherein the thread state is spinning and the event count factored out are interrupt counts for the thread.

8. The method of claim 1, wherein the routine is selected from a group consisting of a method, a subroutine, a procedure, a function, and an instrumented segment.

9. The method of claim 4, wherein the state accumulated value of the event is stored in a first control block different from a second control block containing the non-state accumulated value of the event.

10. The method of claim 1, further comprising:
    producing a report excluding the event counts during the state on the thread and including the event counts during the state in the report for a different thread.

11. A computer program product stored in a non-transitory computer readable medium, comprising computer instructions that when executed by an information handling system, causes the information handling system to eliminate event counts for a routine executing on a thread in a thread state targeted for elimination of event counts, and to perform actions comprising:
    accumulate a per thread event count dynamically for a routine executing on a thread;
    responsive to detecting the routine executing on the thread entering the thread state targeted for elimination of event counts, store an event count indicating a last saved count of an event counter in a control block associated with the thread;
    responsive to detecting an exiting of the thread state, read a current value of the event count and utilizing a difference between the current value of the event count and the last saved event count in the control block associated with the thread calculate a per thread count of the event during the thread state; and
    reduce the per thread count of the event from an accumulated event count for the event for the routine according to the difference.

12. The computer program product of claim 11, wherein the thread state is a software spin loop.

13. The computer program product of claim 11, wherein the last saved count is updated when the thread is dispatched out of the thread state.

14. The computer program product of claim 11, wherein the state is a failure to acquire a resource state for the thread and the event is instructions completed.

15. A system for factoring out event counts for a routine executing on a thread during a state targeted for elimination of event counts comprising:
    a processor;
    a memory connected to the processor;
    an application executing on the processor; and
    wherein the system:
        accumulates a per thread event count dynamically for a routine executing on a thread;
        responsive to detecting the routine executing on the thread entering the thread state targeted for elimination of event counts, stores an event count indicating a last saved count of an event counter in a control block associated with the thread;
        responsive to detecting an exiting of the thread state, reads a current value of the event count and utilizes a difference between the current value of the event count and the last saved event count in the control block associated with the thread to calculate a per thread count of the event during the thread state; and
        reduces the per thread count of the event from an accumulated event count for the event for the routine according to the difference.

16. The system according to claim 15, wherein the thread state is a software spin loop.

17. The system according to claim 15, wherein the routine is selected from a group consisting of a method, a subroutine, a procedure, a function, and an instrumented segment.

18. The system according to claim 15, further comprising:
    storing a state accumulated value of the event in a location in the control block different from a non-state accumulated value of the event.

19. The system according to claims 15, wherein the thread state is a failure to acquire a resource state for the thread.

* * * * *